UNITED STATES PATENT OFFICE.

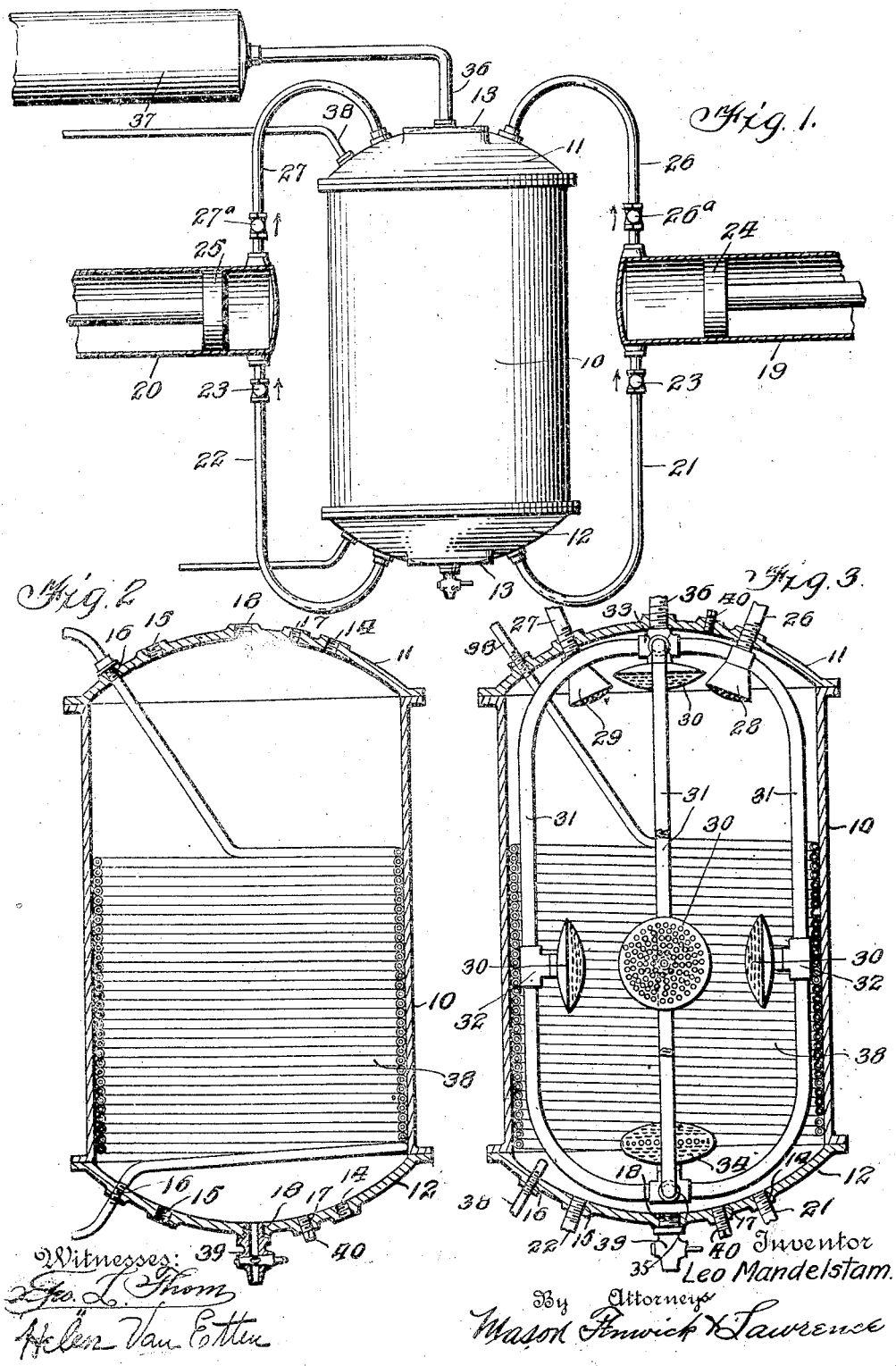

LEO MANDELSTAM, OF NEW YORK, N. Y.

APPARATUS FOR TREATING OILS AND THE LIKE.

1,114,623.

Specification of Letters Patent.

Patented Oct. 20, 1914.

Application filed April 30, 1912, Serial No. 694,073. Renewed March 13, 1913. Serial No. 754,126.

*To all whom it may concern:*

Be it known that I, LEO MANDELSTAM, a citizen of the United States, residing at New York, in the county of New York and State of New York, have invented certain new and useful Improvements in Apparatus for Treating Oils and the like; and I do hereby declare the following to be a full, clear, and exact description of the invention, such as will enable others skilled in the art to which it appertains to make and use the same.

This invention relates to improvements in the apparatus for converting unsaturated fatty acids such as oleic acid, cottonseed oil and similar mixtures of unsaturated fatty acids into solid and semi-solid saturated compounds.

An object of my invention is to provide means for raising the temperature of the oleic acid, cottonseed oil or similar mixtures of unsaturated fatty acids to the desired degree and maintaining the same at such a degree during the treatment.

A further object of my invention is to keep the oils or acids being treated agitated as well as the catalyzers used in said treatment.

A further object of my invention is to provide means for supplying hydrogen to the oil or acid being treated, said hydrogen gas being injected into said oil or acid so as to keep said oil or acid agitated as well as a catalyser therein.

Further objects will be apparent from the following specification, appended claims and drawings, in which, Figure 1 is an elevation of my device, Fig. 2 is a sectional view through the cylinder with the hydrogen gas inlet pipes removed, and, Fig. 3 is a similar view showing the hydrogen gas pipes in place.

The device set forth in this application is to be used in conjunction with a copending application filed April 30th, 1912, Serial Number 694,080, by Isaak Gittelsohn, of which I am the assignee for a process for the conversion of unsaturated fatty acids such as oleic acid, cottonseed oil and similar mixtures of unsaturated fatty acids into solid and semi-solid saturated compounds by the addition of hydrogen.

Referring to the drawings there is shown a cylinder 10 having the heads 11 and 12 secured thereto as by rivets or any other means. Each of the heads 11 and 12 is provided with a hand-hole 13 and threaded openings 14, 15, 16, 17 and 18.

Communicating through the openings 14 and 15 to the head 12 from the inside of the cylinder 10 to the oil pumps 19 and 20 are the pipes 21 and 22, each of which being provided with a check valve 23, said pipes terminating at the bottom of the cylinder 10 so that oil or the contents of the said container may be drawn through said pipes by the action of the pumps 24 and 25 in the cylinders 19 and 20 respectively.

Pipes 26 and 27 provided with check valves 26$^a$ and 27$^a$ are secured to the cylinders 19 and 20 respectively and pass through the openings 14 and 15 of the head 11 and are provided with spraying nozzles 28 and 29 respectively so that the oil and the like drawn up by the pumps 24 and 25 in one direction of their movement is forced through the pipes 26 and 27 in the reverse movement thereof, said oil and the like being sprayed through the nozzles 28 and 29 so as to make the same more susceptible to the treatment by hydrogen gas to be hereinafter described.

The cylinder 10 has a plurality of hydrogen gas sprayers or distributers 30 some of which are secured to the vertical tubes 31 as by the tees 32, sufficiently secured to the six way fitting 33 in the top of the container, the horizontal nipples extending therefrom receive the bent ends of the upright pipes 31 and to the double sprayer 34 is secured a fitting 35 which in turn is secured at the lower curved end of the pipes 31. The sprayer 34 spraying in all directions so as to agitate the catalyzer placed in the cylinder 10 and to prevent the same from accumulating in the bottom of the cylinder 10, the fitting 33 is suspended or carried by the lower end of a pipe 36 which passes through the head 11 and is secured to the hydrogen pump 37.

Interposed between the pipes 31 and the cylinder 10 is a steam coil 38 the ends of which pass through the openings 15 in the heads 11 and 12 and from thence to the source of supply. The head 12 is provided with a drain valve 39 secured in the opening 18 by which valve the contents of the cylinder 10 may be drawn therefrom. The threaded openings 17 of the heads 11 and 12 may be provided with plugs 40.

The operation of this apparatus is as follows: The cylinder 10 is filled to about ⅔ of its capacity with the oil to be treated and the catalyzer also placed therein, then the mixture of oil and catalyzer is heated to 180 degrees C. and hydrogen gas is admitted through the nozzles 30 under pressure, then the liquid is constantly agitated by means of the ingress of hydrogen gas and the pumps 24 and 25 until the oil is sufficiently acted upon. The contents of the cylinder 10 are heated to the desired temperature by the steamcoil 38. When the oil or acid is sufficiently hydrogenized it is then treated with caustic soda to neutralize any free fatty acids remaining in the oil.

I am aware that various modifications may be made within the scope of my invention and I do not restrict myself to the identical form shown as the drawings submitted herewith are for illustrative purposes only.

Having thus described my invention, I claim:

1. In a device of the character described, a container to receive the liquid to be treated, tubing communicating with the top and bottom of said container valves in said tubing to permit passage therethrough in the proper direction, force pumps connected to said tubing spray heads secured to the tubing passing through the upper head of said cylinder, a steam coil within said cylinder adjacent the wall thereof, the ends of said steam coil passing through the openings in the upper and lower head of said cylinder, a hydrogen or other gas supply pipe communicating with said cylinder through the upper head thereof, a plurality of pipes radiating from a fitting secured to said hydrogen or other gas supply pipes, said radiating pipes being bent to substantially parallel position with respect to the walls of said cylinder and further bent to a common fitting adjacent the bottom of said container, a plurality of spray heads secured to said pipes and fitting respectively, said spray heads delivering the gas forced into said container into the sprayed liquid in the upper end of the said container and into the liquid in the bottom of said container, so as to agitate said liquid and means connected to the bottom of said container for withdrawing the contents therefrom.

2. In a device of the character described, a container, a steam coil therein to a predetermined height, spraying means formed therein comprising tubing having its ends communicating with said container through the top and bottom, force pumps coöperating with said tubing and spray heads on said tubing passing through the top, a gas delivery into said container, said delivery comprising a fitting, a spray head secured thereto, radiating pipes therefrom, said radiating pipes being curved to proximity with the walls of said container, spray heads secured to said radiating pipes, said radiating pipes meeting at the bottom, a fitting secured to the meeting ends and a spray head carried by said fitting, said spray head discharging in all directions to avoid the accumulation of a catalyzer in the bottom of said container.

3. In an apparatus for hydrogenizing fatty materials, such as oils, in the presence of a catalyzer of greater specific gravity than the material to be hydrogenized, the combination with a containing vessel for said material, having its bottom closed against the rapid exit of large portions of the material but constructed with means permitting the withdrawal of relatively small quantities from the lower portion of the body of material in the vessel; of means for circulating said withdrawn material and re-introducing it into the upper portion of the vessel; a source of hydrogen gas under pressure; and means connected to said gas supply, located near the bottom of the vessel in the body of mixture of material and catalyzer, and constructed to direct the gas toward the closed bottom of the vessel, to agitate the mixture and raise the catalyzer away from said closed bottom.

4. In an apparatus for hydrogenizing fatty material, such as oils, in the presence of a catalyzer of greater specific gravity than the material to be hydrogenized, the combination with a containing vessel for said material, having its bottom closed against the rapid exit of large portions of the material but constructed with means permitting the withdrawal of relatively small quantities from the lower portion of the body of material in the vessel; of means for circulating said withdrawn material and re-introducing it into the upper portion of the vessel; a source of hydrogen gas under pressure; and means connected to said gas supply, located near the bottom of the vessel in the body of mixture of material and catalyzer, and constructed with outlets directed both downwardly and upwardly, whereby parts of the catalyzer sinking to the closed portion of the bottom are agitated and raised therefrom into an upper part of the body of mixture by the downwardly-flowing gas, and then raised further into the body of the mixture by the upwardly-flowing gas.

5. In an apparatus for hydrogenizing fatty materials, such as oils, in the presence of a catalyzer of greater specific gravity than the material to be hydrogenized, the combination with a containing vessel for said material, having its bottom closed against the rapid exit of large portions of the material but constructed with means permitting the withdrawal of relatively small quantities from the lower portion of the body of material in the vessel; of means for circulating said withdrawn material and re-introducing it into the upper portion of the vessel; a source of hydrogen gas under pressure; and means connected to said gas-supply, located near the bottom of the vessel in the body of mixture of material and catalyzer, and constructed with outlets directed both downwardly and upwardly, whereby parts of the catalyzer sinking to the closed portion of the bottom are agitated and raised therefrom into an upper part of the body of mixture by the downwardly-flowing gas, and then raised further into the body of the mixture by the upwardly-flowing gas; and means, also connected to said gas-supply, located along the inner wall of the vessel, above said first-named means, and constructed and arranged to direct the gas through the liquid mixture toward the center of the vessel.

6. In an apparatus for hydrogenizing fatty materials, such as oils, in the presence of a catalyzer of greater specific gravity than the material to be hydrogenized, the combination with a containing vessel for said material, having its bottom closed against the rapid exit of large portions of the material but constructed with means permitting the withdrawal of relatively small quantities from the lower portion of the body of material in the vessel; of means for circulating said withdrawn material and re-introducing it in the form of spray into the upper portion of the vessel; a source of hydrogen gas under pressure; and means connected to said gas-supply, located near the bottom of the vessel in the body of mixture of material and catalyzer, and constructed with outlets directed both downwardly and upwardly, whereby parts of the catalyzer sinking to the closed portion of the bottom are agitated and raised therefrom into an upper part of the body of mixture by the downwardly-flowing gas, and then raised further into the body of the mixture by the upwardly-flowing gas, and means, also connected to said gas-supply, and located near the top of said vessel, and constructed and arranged to direct the gas through the incoming spray of circulated mixture.

7. In an apparatus for hydrogenizing fatty materials, such as oils, in the presence of a catalyzer of greater specific gravity than the material to be hydrogenized, the combination with a containing vessel for said material, having its bottom closed against the rapid exit of large portions of the material but constructed with means permitting the withdrawal of relatively small quantities from the lower portion of the body of material in the vessel; of means for circulating said withdrawn material and re-introducing it in the form of spray into the upper portion of the vessel; a source of hydrogen gas under pressure; and means connected to said gas supply, located near the bottom of the vessel in the body of mixture of material and catalyzer, and constructed with outlets directed both downwardly and upwardly, whereby parts of the catalyzer sinking to the closed portion of the bottom are agitated and raised therefrom into an upper part of the body of mixture by the downwardly-flowing gas, and then raised further into the body of the mixture by the upwardly-flowing gas; means, also connected to said gas-supply, located along the inner wall of the vessel, above said first-named means, and constructed and arranged to direct the gas through the liquid mixture toward the center of the vessel; and means, also connected to said gas-supply, and located near the top of said vessel, and constructed and arranged to direct the gas through the incoming spray of circulated mixture.

In testimony whereof I affix my signature in presence of two witnesses.

LEO MANDELSTAM.

Witnesses:
 HUGO MOOK,
 SAM'L N. FREEDMAN.